(12) United States Patent
Giridharan et al.

(10) Patent No.: US 12,215,870 B2
(45) Date of Patent: *Feb. 4, 2025

(54) METHOD OF OPERATING A GAS TURBINE COMBUSTOR COMPRISING INJECTING A DILUENT INTO THE PRIMARY AND SECONDARY COMBUSTION ZONES

(71) Applicant: General Electric Company, Schenectady, NY (US)

(72) Inventors: Manampathy G. Giridharan, Mason, OH (US); Pradeep Naik, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/529,360

(22) Filed: Dec. 5, 2023

(65) Prior Publication Data

US 2024/0102656 A1 Mar. 28, 2024

Related U.S. Application Data

(63) Continuation of application No. 17/397,396, filed on Aug. 9, 2021, now Pat. No. 11,846,426.

(30) Foreign Application Priority Data

Jun. 24, 2021 (IN) .............................. 202111028367

(51) Int. Cl.
*F23R 3/34* (2006.01)
*F02C 3/20* (2006.01)
(Continued)

(52) U.S. Cl.
CPC ................ *F23R 3/346* (2013.01); *F02C 3/20* (2013.01); *F02C 3/30* (2013.01); *F23R 3/34* (2013.01);
(Continued)

(58) Field of Classification Search
CPC .... F23R 3/34; F23R 3/36; F23R 3/346; F02C 3/20; F02C 3/30
See application file for complete search history.

(56) References Cited

U.S. PATENT DOCUMENTS 2,930,192 A 3/1960 Johnson
4,265,615 A 5/1981 Lohmann et al.
(Continued)

FOREIGN PATENT DOCUMENTS

EP 1431543 B1 7/2013
JP 2017524888 A 8/2017
(Continued)

*Primary Examiner* — William H Rodriguez
(74) *Attorney, Agent, or Firm* — Venable LLP; David D. Leege; Michele V. Frank

(57) ABSTRACT

A gas turbine engine including a compressor section, a combustor for combusting a fuel, and a turbine. Compressed air flows through a combustion liner of the combustor in a bulk airflow direction. The combustor includes a primary fuel nozzle and a secondary fuel nozzle. The secondary fuel nozzle is downstream of the primary fuel nozzle in the bulk airflow direction. The primary fuel nozzle is configured to inject a primary portion of the fuel into a primary combustion zone, and the secondary fuel nozzle is configured to inject a secondary portion of the fuel into a secondary combustion zone. The secondary combustion zone is located downstream of the primary combustion zone in the bulk airflow direction. The fuel may be one of diatomic hydrogen fuel and a hydrogen enriched fuel.

20 Claims, 9 Drawing Sheets

(51) Int. Cl.
*F02C 3/30* (2006.01)
*F23R 3/36* (2006.01)
*F23R 3/00* (2006.01)
*F23R 3/28* (2006.01)

(52) U.S. Cl.
CPC .............. *F23R 3/36* (2013.01); *F23R 3/002* (2013.01); *F23R 3/286* (2013.01)

(56) References Cited

U.S. PATENT DOCUMENTS

| | | | |
|---|---|---|---|
| 4,292,801 A * | 10/1981 | Wilkes | F23R 3/34 |
| | | | 60/776 |
| 4,420,929 A | 12/1983 | Jorgensen et al. | |
| 4,893,468 A | 1/1990 | Hines | |
| 4,928,481 A | 5/1990 | Joshi et al. | |
| 4,984,429 A | 1/1991 | Waslo et al. | |
| 5,158,445 A * | 10/1992 | Khinkis | F23C 3/006 |
| | | | 431/352 |
| 5,749,219 A | 5/1998 | DuBell | |
| 5,794,449 A * | 8/1998 | Razdan | F23R 3/286 |
| | | | 60/737 |
| 6,189,310 B1 | 2/2001 | Kalitventzeff et al. | |
| 6,311,471 B1 | 11/2001 | Waldherr et al. | |
| 6,564,556 B2 | 5/2003 | Ginter | |
| 6,735,949 B1 | 5/2004 | Haynes et al. | |
| 6,931,853 B2 * | 8/2005 | Dawson | F23R 3/286 |
| | | | 60/725 |
| 7,104,069 B2 | 9/2006 | Martling et al. | |
| 7,870,717 B2 | 1/2011 | MacKnight | |
| 10,054,314 B2 | 8/2018 | Kapilavai et al. | |
| 10,208,958 B2 | 2/2019 | Carroni et al. | |
| 11,578,871 B1 | 2/2023 | Joshi et al. | |
| 2004/0265136 A1 | 12/2004 | Martling et al. | |
| 2006/0107667 A1 | 5/2006 | Haynes et al. | |
| 2007/0031768 A1 | 2/2007 | Schefer et al. | |
| 2007/0089419 A1 | 4/2007 | Matsumoto et al. | |
| 2008/0264033 A1 | 10/2008 | Lacy et al. | |
| 2009/0249793 A1 | 10/2009 | Nilsson et al. | |
| 2010/0011771 A1 | 1/2010 | Evulet et al. | |
| 2010/0170251 A1 | 7/2010 | Davis, Jr. et al. | |
| 2010/0229557 A1 | 9/2010 | Matsumoto et al. | |
| 2011/0179803 A1 | 7/2011 | Berry et al. | |
| 2013/0174558 A1 | 7/2013 | Stryapunin | |
| 2013/0239575 A1 | 9/2013 | Chen et al. | |
| 2013/0283801 A1 | 10/2013 | Romig et al. | |
| 2014/0150445 A1 | 6/2014 | Huntington et al. | |
| 2014/0157788 A1 | 6/2014 | Bathina | |
| 2014/0182294 A1 | 7/2014 | Matsumoto et al. | |
| 2014/0338359 A1 | 11/2014 | Valeev et al. | |
| 2014/0352321 A1 | 12/2014 | Haynes et al. | |
| 2015/0285501 A1 | 10/2015 | DiCintio et al. | |
| 2016/0115839 A1 | 4/2016 | Abrol et al. | |
| 2016/0178207 A1 | 6/2016 | Bothien et al. | |
| 2016/0258629 A1 | 9/2016 | Slobodyanskiy et al. | |
| 2017/0058784 A1 | 3/2017 | Vandale et al. | |
| 2017/0211807 A1 | 7/2017 | Graichen | |
| 2017/0219212 A1 | 8/2017 | Laster et al. | |
| 2017/0284675 A1 | 10/2017 | North et al. | |
| 2017/0298817 A1 | 10/2017 | Horiuchi et al. | |
| 2017/0307210 A1 | 10/2017 | Hirano et al. | |
| 2017/0321609 A1 | 11/2017 | Ogata et al. | |
| 2017/0356656 A1 | 12/2017 | Ogata et al. | |
| 2018/0187893 A1 | 7/2018 | DiCintio et al. | |
| 2018/0209651 A1 | 7/2018 | Cai et al. | |
| 2019/0032559 A1 | 1/2019 | Dai et al. | |
| 2019/0178498 A1 | 6/2019 | Wilson et al. | |
| 2021/0025323 A1 | 1/2021 | Nakao et al. | |
| 2021/0199299 A1 | 7/2021 | Berry et al. | |
| 2021/0404660 A1 | 12/2021 | Godfrey et al. | |

FOREIGN PATENT DOCUMENTS

| | | |
|---|---|---|
| KR | 101523938 B1 | 5/2015 |
| KR | 102151995 B1 | 9/2020 |
| KR | 102152420 B1 | 9/2020 |
| WO | 99/46484 A1 | 9/1999 |
| WO | 2004/064990 A2 | 8/2004 |

* cited by examiner

METHOD OF OPERATING A GAS TURBINE COMBUSTOR COMPRISING INJECTING A DILUENT INTO THE PRIMARY AND SECONDARY COMBUSTION ZONES

CROSS-REFERENCE TO RELATED APPLICATIONS

This application is a continuation of U.S. patent application Ser. No. 17/397,396 filed on Aug. 9, 2021, which claims priority to Indian Patent Application No. 202111028367, filed Jun. 24, 2021, the contents of which are hereby incorporated by reference in their entireties.

TECHNICAL FIELD

Preferred embodiments described herein relate to a combustor used in a gas turbine engine, and, in particular, to a gas turbine engine using hydrogen fuel or hydrogen enriched fuel systems and to a gas turbine engine for an aircraft.

BACKGROUND

The propulsion system for commercial aircraft typically includes one or more aircraft engines, such as turbofan jet engines. The turbofan jet engine(s) may be mounted to a respective one of the wings of the aircraft, such as in a suspended position beneath the wing using a pylon. These engines may be powered by aviation turbine fuel, which is typically a combustible hydrocarbon liquid fuel, such as a kerosene-type fuel, having a desired carbon number. Such fuel produces carbon dioxide upon combustion, and improvements to reduce such carbon dioxide emissions in commercial aircraft are desired. It has been suggested that a hydrogen fuel may be utilized to achieve improvements in the emissions from commercial aircraft.

BRIEF SUMMARY

According to an embodiment, a gas turbine engine includes: (A) a compressor section including a plurality of compressor fan blades configured to compress air flowing therethrough and to provide the air as compressed air; (B) a combustor for combusting a fuel, the combustor configured to receive the compressed air from the compressor section, the combustor including: (a) a combustor liner having (i) a combustion chamber formed therein, (ii) a forward end, and (iii) an outlet, the combustor liner being configured to have the compressed air flow therethrough in a bulk airflow direction from the forward end of the combustion chamber to the outlet of the combustion chamber, the combustion chamber having a primary combustion zone and a secondary combustion zone located downstream of the primary combustion zone in the bulk airflow direction; (b) at least one primary fuel nozzle at the forward end of the combustor liner, the at least one primary fuel nozzle being configured to inject a primary portion of the fuel into the primary combustion zone; and (c) at least one secondary fuel nozzle downstream of the at least one primary fuel nozzle in the bulk airflow direction, the at least one secondary fuel nozzle being configured to inject a secondary portion of the fuel into the secondary combustion zone, wherein the combustor is configured to mix the compressed air with the primary portion of the fuel and the secondary portion of the fuel to form a fuel and air mixture, to combust the fuel and air mixture forming combustion products, and to discharge the combustion products through the outlet of the combustion chamber; and (C) a turbine configured to receive the combustion products and be driven by the combustion products, wherein the turbine is configured to rotate the plurality of compressor fan blades of the compressor section.

Additional features, advantages, and embodiments of the present disclosure are set forth or apparent from consideration of the following detailed description, drawings and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

FIG. 10A is the cross section of the secondary fuel nozzle shown in FIGS. 6 and 7, and FIG. 10B is a cross-sectional view of an alternate geometry of the secondary fuel nozzle.

DETAILED DESCRIPTION

Various embodiments are discussed in detail below. While specific embodiments are discussed, this is done for illustration purposes only. A person skilled in the relevant art will recognize that other components and configurations may be used without departing from the spirit and scope of the present disclosure.

As noted above, it has been suggested that a hydrogen fuel may be utilized to achieve improvements in the emissions from commercial aircraft. Hydrogen fuel, however, poses a number of challenges as compared to combustible hydrocarbon liquid fuel. Hydrogen fuel, for example, is a reactive fuel that burns at higher temperatures than combustible hydrocarbon liquid fuel. When hydrogen fuel is used in current gas turbine engines with rich burn combustors, the higher combustion temperature requires additional water (or other diluent) additions to reduce the production of nitrogen oxides ("NOx"), as compared combustible hydrocarbon liquid fuel. Injecting additional water quenches flame resulting in higher production of carbon monoxide and reduces efficiency.

The present disclosure discusses ways to achieve NOx emissions targets with improved efficiency and less diluent, such as water, consumption than in conventional rich burn combustors. The combustors and methods discussed herein distribute the injection of fuel and diluent into a combustion chamber of a combustor with a portion of the fuel and/or a portion of the diluent being injected at the forward end of the combustion chamber and the remaining portion of the fuel and/or diluent being injected downstream in a bulk airflow direction. Such a combustor and method have advantages of reducing the average dwell time of the fuel and diluent in the combustor and reducing the amount of NOx that is produced. In addition, the diluent can be targeted towards certain regions of the combustor. Some regions of the combustor have be hot spots, where the temperature is locally elevated relative to the surrounding temperature. Hot spots are locations of increased NOx production. Diluent can be targeted towards these hot spots creating a more uniform temperature distribution throughout the combustor and reducing the total amount of diluent, such as water, consumed compared to a combustor where all of the water is introduced at the forward end of the combustor.

The combustors and methods discussed herein are particularly suited for use in combustors of gas turbine engines using a highly reactive fuel such as hydrogen fuel (diatomic hydrogen fuel) or hydrogen enriched fuel. As discussed above, such fuels burn hotter and thus may create higher amounts of NOx. The combustors and methods discussed herein enable these fuel systems to be used while achieving NOx emissions targets with improved efficiency and less diluent, such as water, consumption.

Figure 1:
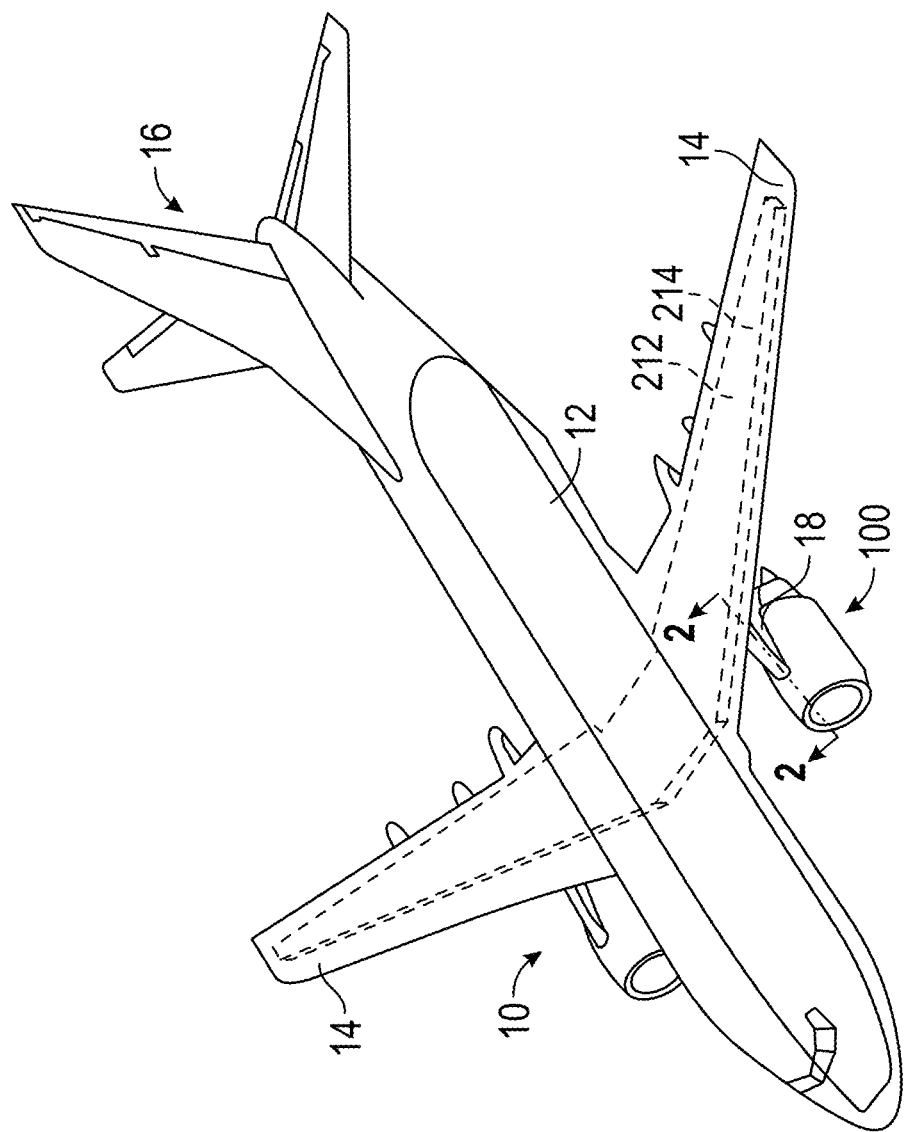
FIG. 1 is a schematic perspective view of an aircraft having a fuel system according to an embodiment of the present disclosure.

A particularly suitable application for the combustors and methods discussed herein is in gas turbine engine used on aircraft. FIG. 1 is a perspective view of an aircraft 10 that may implement various preferred embodiments. The aircraft 10 includes a fuselage 12, wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16, and the fuselage 12.

As will be described further below with reference to FIG. 2, the engines 100 shown in FIG. 1 are gas turbine engines that are each capable of selectively generating a propulsive thrust for the aircraft 10. The amount of propulsive thrust may be controlled at least in part based on a volume of fuel provided to the gas turbine engines 100 via a fuel system 200. The fuel is stored in a fuel tank 212 of the fuel system 200. As shown in FIG. 1, at least a portion of the fuel tank 212 is located in each wing 14 and a portion of the fuel tank 212 is located in the fuselage 12 between the wings 14. The fuel tank 212, however, may be located at other suitable locations in the fuselage 12 or the wing 14. The fuel tank 212 may also be located entirely within the fuselage 12 or the wing 14. The fuel tank 212 may also be separate tanks instead of a single, unitary body, such as, for example, two tanks each located within a corresponding wing 14. A diluent is also provided to the gas turbine engines 100 via the fuel system 200. The diluent is stored in a diluent tank 214. The diluent tank 214 may be located on the aircraft 10 in the same positions as the fuel tank 212 discussed above.

Although the aircraft 10 shown in FIG. 1 is an airplane, the embodiments described herein may also be applicable to other aircraft 10, including, for example, helicopters. In addition, the embodiments described herein may also be applicable to other applications where hydrogen is used as a fuel. The engines described herein are gas turbine engines, but the embodiments described herein also may be applicable to other engines. The engine 100 may be used in various other applications including stationary power generation systems and other vehicles beyond the aircraft 10 explicitly described herein, such as boats, ships, cars, trucks, and the like.

For the embodiment depicted, the engine 100 is a high bypass turbofan engine. The engine 100 may also be referred to as a turbofan engine 100 herein. FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. The turbofan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the axial direction A. The turbofan engine 100 includes a fan section 102 and a turbomachine 104 disposed downstream from the fan section 102.

Figure 2:
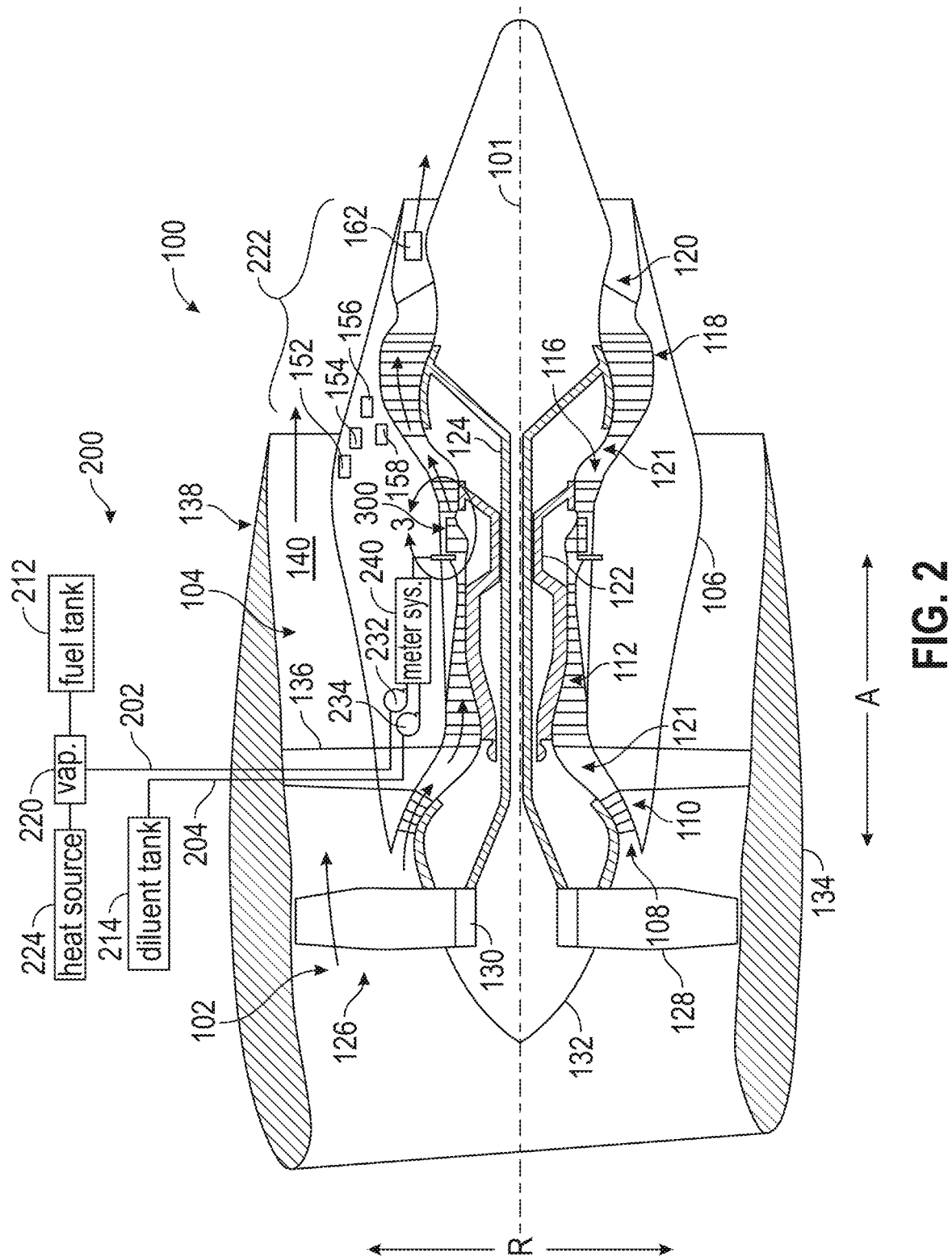
FIG. 2 is a schematic, cross-sectional view, taken along line 2-2 in FIG. 1, of a gas turbine engine for the aircraft shown in FIG. 1.

The turbomachine 104 depicted in FIG. 2 includes a tubular outer casing 106 that defines an annular inlet 108. The outer casing 106 encases, in a serial flow relationship, a compressor section including a booster or low-pressure (LP) compressor 110 and a high-pressure (HP) compressor 112, a combustion section 300 (also referred to herein as a combustor 300), a turbine section including a high-pressure (HP) turbine 116 and a low-pressure (LP) turbine 118, and a jet exhaust nozzle section 120. The compressor section, the combustor 300, and the turbine section together define at least in part a core air flowpath 121 extending from the annular inlet 108 to the jet exhaust nozzle section 120. The turbofan engine further includes one or more drive shafts. More specifically, the turbofan engine includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The fan section 102 shown in FIG. 2 includes a fan 126 having a plurality of fan blades 128 coupled to a disk 130 in a spaced-apart manner. The fan blades 128 and the disk 130 are rotatable, together, about the longitudinal centerline (axis) 101 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially spaced outlet guide vanes 136. A downstream section 138 of the nacelle 134 extends over an outer portion of the turbomachine 104 so as to define a bypass airflow passage 140 therebetween.

The turbofan engine 100 is operable with the fuel system 200 and receives a flow of fuel from the fuel system 200. As will be described further below, the fuel system 200 includes a fuel delivery assembly 202 providing the fuel flow from the fuel tank 212 to the engine 100, and more specifically to a plurality of primary fuel nozzles 340 and a plurality of secondary fuel nozzles 400 (not labeled in FIG. 2; see FIG. 3) of the combustor 300 of the turbomachine 104 of the turbofan engine 100.

The turbofan engine 100 also includes various accessory systems to aid in the operation of the turbofan engine 100 and/or an aircraft including the turbofan engine 100. For example, the turbofan engine 100 may include a main lubrication system 152, a compressor cooling air (CCA) system 154, an active thermal clearance control (ATCC) system 156, and generator lubrication system 158, each of which is depicted schematically in FIG. 2. The main lubrication system 152 is configured to provide a lubricant to, for example, various bearings and gear meshes in the compressor section, the turbine section, the HP spool 122, and the LP shaft 124. The lubricant provided by the main lubrication system 152 may increase the useful life of such components and may remove a certain amount of heat from such components. The compressor cooling air (CCA) system 154 provides air from one or both of the HP compressor 112 or LP compressor 110 to one or both of the HP turbine 116 or LP turbine 118. The active thermal clearance control (ATCC) system 156 cools a casing of the turbine section to maintain a clearance between the various turbine rotor blades and the turbine casing within a desired range throughout various engine operating conditions. The generator lubrication system 158 provides lubrication to an electronic generator (not shown), as well as cooling/heat removal for the electronic generator. The electronic generator may provide electrical power to, for example, a startup electrical motor for the turbofan engine 100 and/or various other electronic components of the turbofan engine 100 and/or an aircraft including the turbofan engine 100.

Heat from these accessory systems 152, 154, 156, 158, and other accessory systems, may be provided to various heat sinks as waste heat from the turbofan engine 100 during operation, such as to various vaporizers 220, as discussed below. Additionally, the turbofan engine 100 may include one or more heat exchangers 162 within, for example, the turbine section or jet exhaust nozzle section 120 for extracting waste heat from an airflow therethrough to also provide heat to various heat sinks, such as the vaporizers 220, discussed below.

It will be appreciated, however, that the turbofan engine 100 discussed herein is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, and the like. In such a manner, it will further be appreciated that, in other embodiments, the gas turbine engine may have other suitable configurations, such as other suitable numbers or arrangements of shafts, compressors, turbines, fans, etc. Further, although the turbofan engine 100 is shown as a direct drive, fixed-pitch turbofan engine 100, in other embodiments, a gas turbine engine may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, still, in alternative embodiments, aspects of the present disclosure may be incorporated into, or otherwise utilized with, any other type of engine, such as reciprocating engines. Additionally, in still other exemplary embodiments, the exemplary turbofan engine 100 may include or be operably connected to any other suitable accessory systems. Additionally, or alternatively, the exemplary turbofan engine 100 may not include or be operably connected to one or more of the accessory systems 152, 154, 156, 158, and 162, discussed above.

The fuel system 200 of this embodiment is configured to store the fuel for the engine 100 in the fuel tank 212 and to deliver the fuel to the engine 100 via the fuel delivery assembly 202. The fuel delivery assembly 202 includes tubes, pipes, and the like, to fluidly connect the various components of the fuel system 200 to the engine 100. As discussed above, the engine 100, and in particular the combustor 300 discussed herein may be particularly suited for use with highly reactive fuels such as hydrogen fuel (diatomic hydrogen) or hydrogen enriched fuels. In the embodiments discussed herein, the fuel is a hydrogen fuel.

The fuel tank 212 may be configured to hold the hydrogen fuel at least partially within the liquid phase, and may be configured to provide hydrogen fuel to the fuel delivery assembly 202 substantially completely in the liquid phase, such as completely in the liquid phase. For example, the fuel tank 212 may have a fixed volume and contain a volume of the hydrogen fuel in the liquid phase (liquid hydrogen fuel). As the fuel tank 212 provides hydrogen fuel to the fuel delivery assembly 202 substantially completely in the liquid phase, the volume of the liquid hydrogen fuel in the fuel tank 212 decreases and the remaining volume in the fuel tank 212 is made up by, for example, hydrogen in the gaseous phase (gaseous hydrogen). It will be appreciated that as used herein, the term "substantially completely" as used to describe a phase of the hydrogen fuel refers to at least 99% by mass of the described portion of the hydrogen fuel being in the stated phase, such as at least 97.5%, such as at least 95%, such as at least 92.5%, such as at least 90%, such as at least 85%, or such as at least 75% by mass of the described portion of the hydrogen fuel being in the stated phase.

To store the hydrogen fuel substantially completely in the liquid phase, the hydrogen fuel is stored in the fuel tank 212 at very low (cryogenic) temperatures. For example, the hydrogen fuel may be stored in the fuel tank 212 at about −253 Deg. Celsius or less at atmospheric pressure, or at other temperatures and pressures to maintain the hydrogen fuel substantially in the liquid phase. The fuel tank 212 may be made from known materials such as titanium, Inconel®, aluminum, or composite materials. The fuel tank 212 and the fuel system 200 may include a variety of supporting structures and components to facilitate storing the hydrogen fuel in such a manner.

The liquid hydrogen fuel is supplied from the fuel tank 212 to the fuel delivery assembly 202. The fuel delivery assembly 202 may include one or more lines, conduits, etc., configured to carry the hydrogen fuel between the fuel tank 212 and the engine 100. The fuel delivery assembly 202 thus provides a flow path of the hydrogen fuel from the fuel tank 212 to the engine 100. The hydrogen fuel is delivered to the engine by the fuel delivery assembly 202 in the gaseous phase, the supercritical phase, or both (at least one of the gaseous phase and the supercritical phase). The fuel system 200 thus includes a vaporizer 220 in fluid communication with the fuel delivery assembly 202 to heat the liquid hydrogen fuel flowing through the fuel delivery assembly 202. The vaporizer 220 is positioned in the flow path of the hydrogen fuel between the fuel tank 212 and the engine 100. The vaporizer 220 may be positioned at least partially within the fuselage 12 or the wing 14, such as at least partially within the wing 14. The vaporizer 220 may, however, be positioned at other suitable locations in the flow path of the hydrogen between the fuel tank 212 and the engine 100. For example, the vaporizer 220 may be positioned external to the fuselage 12 and the wing 14 and positioned at least partially within the pylon 18 or the engine 100. When positioned in the engine 100, the vaporizer may be located in the nacelle 134, for example. Although only one vaporizer 220 is shown in FIG. 2, the fuel system 200 may include multiple vaporizers 220. For example, when a vaporizer 220 is positioned in the engine 100 or in the pylon 18 and functions as a primary vaporizer configured to operate once the engine 100 is in a thermally stable condition, another vaporizer 220 is positioned upstream of the primary vaporizer and proximate to the fuel tank 212 and functions as a primer vaporizer during start-up (or prior to start-up) of the engine 100.

The vaporizer 220 is in thermal communication with at least one heat source 222, 224. In this embodiment, the vaporizer 220 is in thermal communication with a primary heat source 222 and an auxiliary heat source 224. In this embodiment, primary heat source 222 is waste heat from the engine 100, and the vaporizer 220 is thus thermally connected to at least one of the main lubrication system 152, the compressor cooling air (CCA) system 154, the active thermal clearance control (ATCC) system 156, the generator lubrication system 158, and the heat exchangers 162 to extract waste heat from the engine 100 to heat the hydrogen fuel. In such a manner, it will be appreciated that the vaporizer 220 is configured to operate by drawing heat from the primary heat source 222 once the engine 100 is capable of providing enough heat, via the auxiliary heat source 224, to the vaporizer 220, in order to facilitate operation of the vaporizer 220.

The vaporizer 220 may be heated by any suitable heat source, and, in this embodiment, for example, the auxiliary heat source 224 is a heat source external to the engine 100. The auxiliary heat source 224 may include, for example, an electrical power source, a catalytic heater or burner, and/or a bleed airflow from an auxiliary power unit. The auxiliary heat source 224 may be integral to the vaporizer 220, such as when the vaporizer 220 includes one or more electrical resistance heaters, or the like, that are powered by the electrical power source. In this configuration the auxiliary heat source 224 may provide heat for the vaporizer 220 independent of whether or not the engine 100 is running and can be used, for example, during start-up (or prior to start-up) of the engine 100.

As noted, the vaporizer 220 is in communication with the flow of the hydrogen fuel through the fuel delivery assembly 202. The vaporizer 220 is configured to draw heat from at least one of the primary heat source 222 and the auxiliary heat source 224 to heat the flow of hydrogen fuel from a substantially completely liquid phase to a substantially completely gaseous phase or to a substantially completely supercritical phase.

The fuel delivery assembly 202 also includes a high-pressure pump 232 to induce the flow of the hydrogen fuel through the fuel delivery assembly 202 to the engine 100. The high-pressure pump 232 may generally be the primary source of pressure rise in the fuel delivery assembly 202 between the fuel tank 212 and the engine 100. The high-pressure pump 232 may be configured to increase a pressure in the fuel delivery assembly 202 to a pressure greater than a pressure within a combustion chamber 330 of the combustor 300 of the engine 100. For example, the high-pressure pump 232 may be configured to increase a pressure in the fuel delivery assembly 202 to at least four hundred pounds per square inch ("psi"), such as to at least five hundred psi, such as to at least six hundred psi, such as to at least seven hundred psi, such as to at least seven hundred fifty psi, such as up to two thousand psi.

The high-pressure pump 232 is positioned within the flow of hydrogen fuel in the fuel delivery assembly 202 at a location downstream of the vaporizer 220. In this embodiment, the high-pressure pump 232 is positioned external to the fuselage 12 and the wing 14, and is positioned at least partially within the pylon 18, or at least partially within the engine 100. More specifically, the high-pressure pump 232 is positioned within the engine 100. With the high-pressure pump 232 located in such a position, the high-pressure pump 232 may be any suitable pump configured to receive the flow of hydrogen fuel in substantially completely a gaseous phase or a supercritical phase. It will be appreciated, however, that, in other embodiments, the high-pressure pump 232 may be positioned at any other suitable locations, including other positions within the flow path of the hydrogen fuel. For example, the high-pressure pump 232 may be located upstream of the vaporizer 220 and may be configured to receive the flow of hydrogen fuel through the fuel delivery assembly 202 in a substantially completely liquid phase.

As will be discussed further below, a diluent is also used during combustion of the fuel. The diluent is stored in the diluent tank 214, as discussed above, and delivered to the engine 100 via a diluent delivery assembly 204. The diluent delivery assembly 204 includes tubes, pipes, and the like, to fluidly connect the various components used to deliver the diluent to the engine 100. In this embodiment, the diluent is water, but any suitable diluent may be used, including, for example, nitrogen and carbon dioxide. The diluent delivery assembly 204 also includes a diluent pump 234 to induce the flow of the diluent through the diluent delivery assembly 204 to the engine 100. The diluent pump 234 may generally be the primary source of pressure rise in the diluent delivery assembly 204 between the diluent tank 214 and the engine 100. The diluent pump 234 may be configured to increase a pressure in the diluent delivery assembly 204 to a pressure greater than a pressure within a combustion chamber 330 of the combustor 300 of the engine 100.

The diluent pump 234 is positioned within the flow of diluent in the diluent delivery assembly 204 at a location downstream of the diluent tank 214. In this embodiment, the diluent pump 234 is positioned external to the fuselage 12 and the wing 14, and is positioned at least partially within the pylon 18, or at least partially within the engine 100. More specifically, the diluent pump 234 is positioned within the engine 100. It will be appreciated, however, that, in other embodiments, the diluent pump 234 may be positioned at any other suitable locations, including other positions within the flow path of the diluent.

Figure 3:
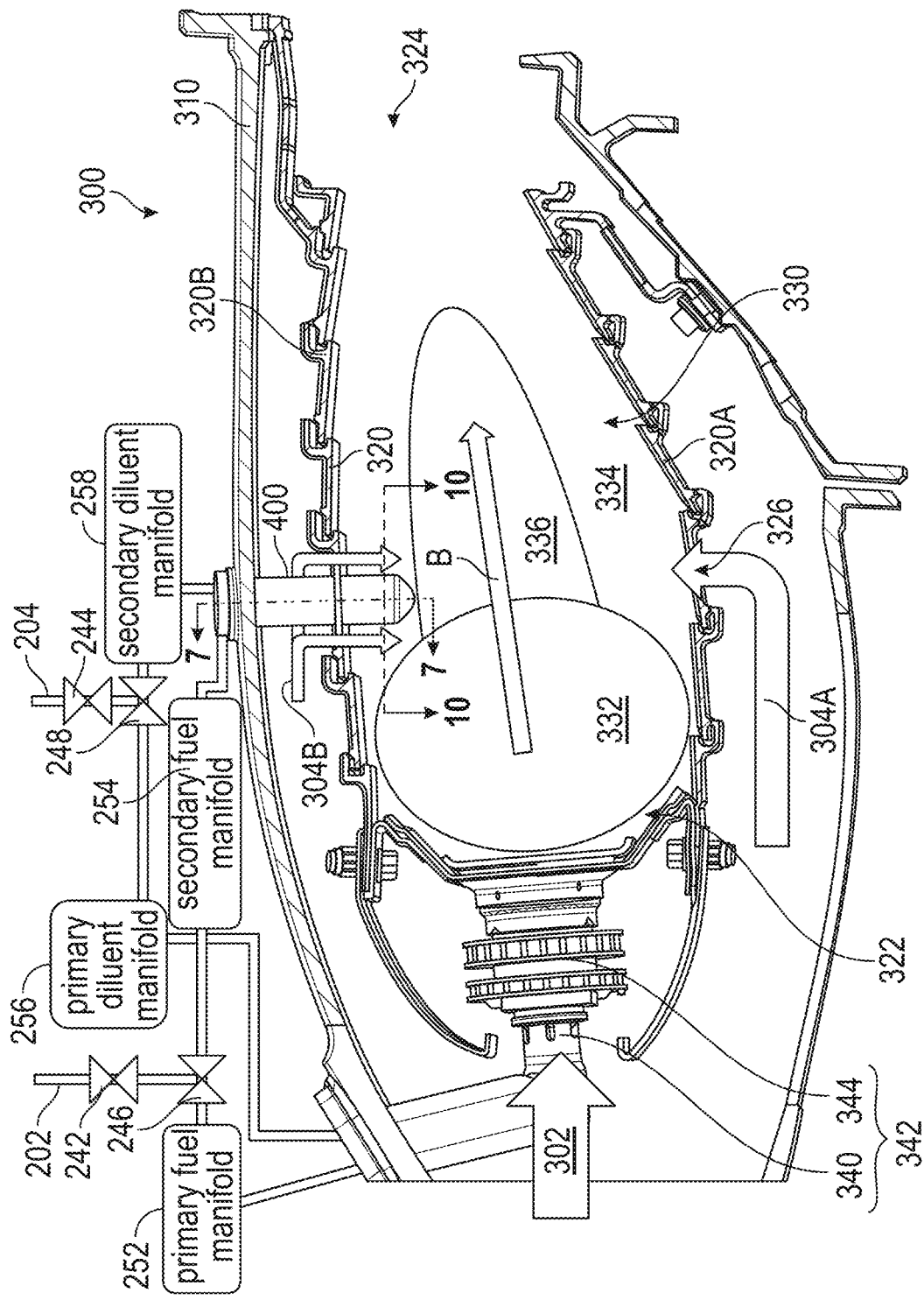
FIG. 3 is cross-sectional view of a combustor for the gas turbine engine shown in FIG. 2, showing detail 3 of FIG. 2.

The fuel system 200 also includes a metering system 240 in fluid communication with the fuel delivery assembly 202 and the diluent delivery assembly 204. Any suitable metering system 240 may be used, such as a series of metering valves and proportioning valves. As shown in FIG. 3, for example, a fuel metering valve 242 and a diluent metering valve 244 may be placed in fluid communication with the fuel delivery assembly 202 and the diluent delivery assembly 204, respectively. The fuel delivery assembly 202 is configured to provide the fuel metering valve 242, and the fuel metering valve 242 is configured to receive, hydrogen fuel, and, likewise, the diluent delivery assembly 204 is configured to provide the diluent metering valve 244, and the diluent metering valve 244 is configured to receive, the diluent. The fuel metering valve 242 and the diluent metering valve 244 are further configured to provide the flow of fuel and diluent, respectively, to the engine 100 in a desired manner. The fuel metering valve 242 is configured to provide a desired volume of hydrogen fuel, at, for example, a desired flow rate, to a combustion chamber 330 of the combustor 300, and the diluent metering valve 244 is configured to provide a desired volume of diluent, at, for example, a desired flow rate, to a combustion chamber 330 of the combustor 300. Adjusting the fuel metering valve 242 changes the volume of fuel provided to the combustion chamber 330 of the combustor 300 and, thus, changes the amount of propulsive thrust produced by the engine 100 to propel the aircraft 10. The diluent metering valve 244 may be adjusted in conjunction with the fuel metering valve 242 to change the volume of diluent provided to the combustion chamber 330 of the combustor 300 as the amount of fuel is changed. Additional details of the metering system 240 will be discussed further below.

Figure 4:
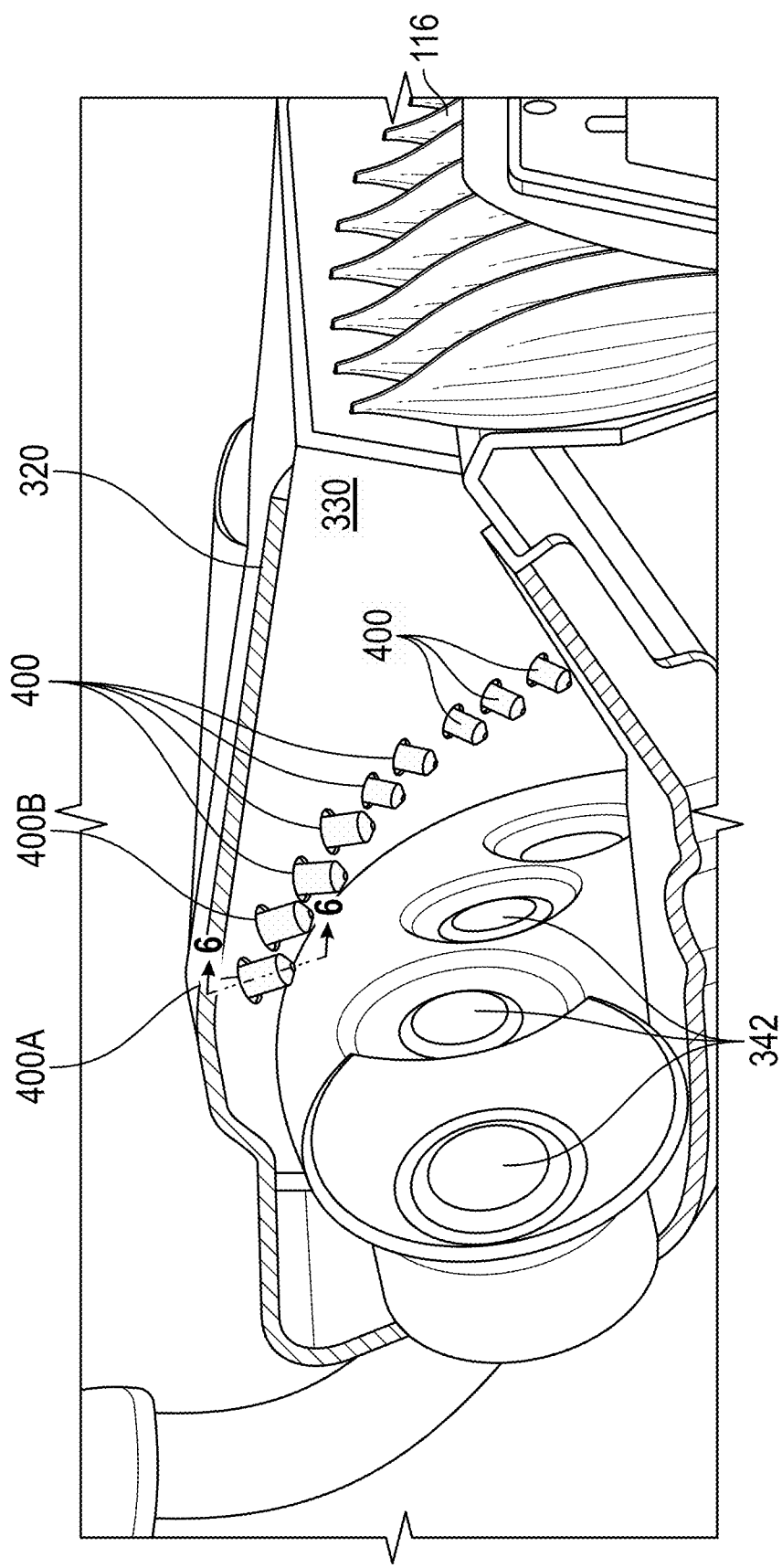
FIG. 4 is a perspective view of the combustor shown in FIG. 3.

FIGS. 3 and 4 show the combustor 300 of the engine 100 according to an embodiment of the present disclosure. FIG. 3 is a detail view showing detail 3 in FIG. 2, and, as FIG. 2 is a cross-sectional view, FIG. 3 is also a cross-sectional view of the combustor 300. FIG. 4 is a perspective view of the combustor 300. The combustor 300 includes a combustor case 310 and a combustor liner 320. The combustor liner 320 of this embodiment has a combustor inner liner 320A and a combustor outer liner 320B. A combustion chamber 330 is formed within the combustor liner 320. The combustor liner 320, and thus also the combustion chamber 330, has a forward end 322 and an outlet 324. A primary fuel nozzle 340 is positioned at the forward end 322 of the combustion chamber 330. The primary fuel nozzle 340 of this embodiment is part of a swirler/fuel nozzle assembly 342. In this embodiment, the combustor 300 is an annular combustor 300 and a plurality of primary fuel nozzles 340 is arranged in an annular configuration as shown in FIG. 4 with the plurality of primary fuel nozzles 340 (the swirler/fuel nozzle assemblies 342) aligned in a circumferential direction of the combustor.

As discussed above, the compressor section, the combustor 300, and the turbine section form, at least in part, the core air flowpath 121 extending from the annular inlet 108 to the jet exhaust nozzle section 120. Air entering through the annular inlet 108 is compressed by blades of a plurality of fans of the LP compressor 110 and HP compressor 112. A portion of the compressed air (primary air 302) enters the forward end 322 of the combustion chamber 330. Fuel is injected by the primary fuel nozzle 340 into the primary air 302 and mixed with the primary air 302. As noted above, the primary fuel nozzle 340 of this embodiment is part of a swirler/fuel nozzle assembly 342. The swirler/fuel nozzle assembly 342 includes a swirler 344 that is used to generate turbulence in the primary air 302. The primary fuel nozzle 340 injects fuel into the turbulent airflow of the primary air 302 and the turbulence promotes rapid mixing of the fuel with the primary air 302.

The mixture of fuel and compressed air is combusted in the combustion chamber 330, generating combustion gases (combustion products), which accelerate as the combustion gases leave the combustion chamber 330. The products of combustion are accelerated as the products are expelled through the outlet 324 to drive the engine 100. The primary air 302 thus flows in a bulk airflow direction (indicated by the arrow B in FIG. 3) from the forward end 322 of the combustion chamber 330 to the outlet 324. The terms "downstream" and "upstream" may be used to describe the position of components in the combustor 300 or locations in the combustor 300 relative to the direction of the bulk airflow B. Much of the fuel injected by the primary fuel nozzle 340 is combusted in a primary combustion zone 332 in the region of the combustor 300 directly downstream of the primary fuel nozzle 340. The combusted fuel air mixture is then accelerated through the outlet 324 to turn the turbines (e.g., drive the turbine blades) of the HP turbine 116 and the LP turbine 118. As discussed above the HP turbine 116 and the LP turbine 118, among other things, drive the LP compressor 110 and HP compressor 112.

Another portion of the compressed air (inner liner dilution air 304A) flows around the outside of the combustor liner 320 and is introduced into the combustion chamber 330 by dilution holes 326 formed in the combustor inner liner 320A at positions downstream of the primary fuel nozzle 340. The inner liner dilution air 304A helps quench combustion gasses from primary zone before being introduced into the turbine section of the engine 100. The inner liner dilution air 304A bypasses the forward end 322 of the combustion chamber 330 and the primary combustion zone 332. The inner liner dilution air 304A is introduced into a secondary combustion zone 334, which, in this embodiment, is the portion of the combustion chamber 330 downstream of the primary combustion zone 332. The inner liner dilution air 304A flows into the combustion chamber 330 through at least one dilution hole 326 in the combustor inner liner 320A. The combustion products from the primary combustion zone 332 flow in a cross flowing direction with the inner liner dilution air 304A. Similarly, outer liner dilution air 304B flows into the combustion chamber 330 through at least one dilution hole 326 in the combustor outer liner 320B. The combustion products from the primary combustion zone 332 flow in cross flowing direction with the outer liner dilution air 304B. Collectively the inner liner dilution air 304A and the outer liner dilution air 304B may be referred to as dilution air 304 herein. Dilution air 304 introduced through dilution holes 326 reduces the temperature in a core region 336 of the combustion chamber 330. More specifically, the inner liner dilution air 304A and the outer liner dilution air 304B penetrate inside the combustor and reduce the high temperature in the core region 336 of the combustion chamber 330.

The combustor 300 of this embodiment also includes a plurality of secondary fuel nozzles 400, and, as will be discussed in more detail below, the secondary fuel nozzles 400 are configured to inject a portion of the fuel into the combustion chamber 330. Each secondary fuel nozzle 400 is positioned downstream of the primary fuel nozzle 340. In this embodiment, the secondary fuel nozzle 400 projects into the combustion chamber 330 and through the combustor liner 320. More specifically in this embodiment, the secondary fuel nozzle 400 projects through the combustor outer liner 320B and is located within a corresponding dilution hole 326 such that outer liner dilution air 304B flows around the outside of the secondary fuel nozzle 400 (see also FIGS. 6 and 7). The secondary fuel nozzle 400 does not need to be located within the dilution hole 326, however, and may project through the combustor liner 320 at other locations. Locating the secondary fuel nozzle 400 in the dilution hole 326, however, has the advantage of using the outer liner dilution air 304B to help cool the secondary fuel nozzle 400 and thus extend the life of the secondary fuel nozzle 400. Additionally, the dilution air 304 that flows around secondary fuel nozzle 400 and along the secondary fuel nozzle 400 can have higher penetration into the core region 336 of the combustion chamber 330 to efficiently reduce temperature in the core region 336 of the combustion chamber 330 and further reduce NOx production. In the annular combustor 300 of this embodiment, the plurality of secondary fuel nozzles 400 are aligned in a direction transverse to the bulk airflow direction, as shown in FIG. 4. When the combustor 300 is an annular combustor 300, the plurality of secondary fuel nozzles 400 may be aligned in the circumferential direction of the combustor 300. This direction is transverse to the bulk airflow direction B and may be referred to herein as a lateral direction.

A portion of the fuel is injected into the combustor 300 using the plurality of primary fuel nozzles 340. This portion of the fuel is referred to herein as the primary portion of the fuel. The remainder of the fuel is injected into the combustor 300 using the plurality of secondary fuel nozzles 400, and in this embodiment, the remainder of the fuel is injected into the combustor 300 in a transverse direction to the bulk airflow direction B using the plurality of secondary fuel nozzles 400. This portion of the fuel is referred to herein as the secondary portion of the fuel. By this configuration and strategy, NOx production can be reduced as compared to the configuration where one hundred percent of the fuel is injected by the primary fuel nozzles 340. One effect of injecting fuel downstream of the forward end 322 of the combustion chamber 330 with the plurality of the secondary fuel nozzles 400 is that the secondary portion of the fuel has a shorter dwell time in the combustion chamber 330, which can contribute to the reduction in NOx production. Preferably, the primary portion of the fuel is from thirty percent to eighty percent of the fuel being injected into the combustion chamber over a given time interval, and the secondary portion of the fuel is the remaining portion of the fuel injected into the combustion chamber over the time interval (e.g., twenty to seventy percent). These percentages may also be determined for a segment of the combustor 300. In the annular combustor 300 shown in FIG. 4, for example, the segment is formed by the angular span formed by at least one primary fuel nozzle 340. In this example, the segment includes one primary fuel nozzle 340 and two secondary fuel nozzles 400 (e.g., secondary fuel nozzle 400A and secondary fuel nozzle 400B). Likewise, there can also be a single secondary fuel nozzle 400 or a plurality of secondary fuel nozzles 400 within each segment. When a plurality of secondary fuel nozzles 400 is used, the secondary fuel nozzles 400 may be placed at the same axial location within the combustion chamber 330 and may be aligned in a direction transverse to the bulk airflow direction B, such as the lateral direction. Alternatively, the secondary fuel nozzles 400 may be placed at different axial locations and may be aligned in the in the axial direction (such as in the bulk airflow direction B) or may have different circumferential locations inside the segment of the combustion chamber 330.

As discussed above, the fuel metering valve 242 is configured to provide a desired volume of fuel, at, for example, a desired flow rate, to the combustion chamber 330. As shown in FIG. 3, the fuel metering valve 242 is fluidly connected to a primary fuel manifold 252 and a secondary fuel manifold 254. The primary fuel manifold 252 and the secondary fuel manifold 254 distribute (provide) the fuel received to the primary fuel nozzles 340 and secondary fuel nozzles 400, respectively. After being metered to the desired flow rate by the fuel metering valve 242, the fuel is then split based on the desired percentage distribution to the primary fuel manifold 252 and the secondary fuel manifold 254 to be subsequently injected into the combustion chamber 330 by the primary fuel nozzles 340 and the secondary fuel nozzles 400. The ratio (percentage) of fuel injected by the primary fuel nozzles 340 and the secondary fuel nozzles 400 may be set (or static) for a given combustor 300, but this ratio may also be adjustable across different operating conditions of engine 100. For example, the metering system 240 may also include at least one fuel proportioning valve 246 that can be used to adjust the amount of fuel distributed to the primary fuel manifold 252 and the secondary fuel manifold 254.

As noted above, a diluent, such as at least one of water, nitrogen, and carbon dioxide, may be injected into the combustion chamber 330 and used during the combustion of the fuel. The diluent may be injected into the forward end 322 of the combustion chamber 330 using the primary fuel nozzle 340. In this embodiment, the primary fuel nozzle 340 is configured to inject both fuel and diluent into the primary combustion zone 332, but other suitable configurations may be used including, for example, where the primary fuel nozzle 340 injects fuel and separate diluent nozzles configured to inject the diluent into the primary combustion zone 332 are used.

Although one hundred percent of the diluent may be injected into the primary combustion zone 332 by, for example, the primary fuel nozzle 340, the combustor 300 disclosed herein injects diluent downstream of the primary fuel nozzle 340, targeting high temperature regions (hot spots) in the combustion chamber 330. Introducing diluent targeted to the location of the hot spots creates a more uniform temperature distribution throughout the combustor while reducing the total amount of diluent, such as water, consumed compared to a combustor 300 in which all of the diluent (e.g., water) is introduced to the forward end 322 of the combustion chamber 330. In addition, reducing or eliminating these hot spots further reduces NOx production.

In this embodiment, the secondary fuel nozzle 400 is configured to inject both fuel and diluent into the combustion chamber 330, and the secondary fuel nozzle 400 is configured to direct the diluent towards hot spots in the combustion chamber 330. Details of the secondary fuel nozzle 400 of this embodiment are discussed below, and, in this configuration, both secondary fuel nozzles 400 (labeled 400A and 400B in FIG. 4) in a segment inject both fuel and diluent. The combustor 300, however, is not so limited and other suitable configurations may be used. In each segment, for example, one secondary fuel nozzle 400A may be configured to inject the secondary portion of the fuel into the segment and the segment may also include a diluent nozzle 400B configured to inject diluent into the segment. In such a configuration, the combustor 300 may thus include a plurality of diluent nozzles 400B downstream of the plurality of primary fuel nozzles 340 in the bulk airflow direction, and the plurality of secondary fuel nozzles 400A and the plurality of diluent nozzles 400B may be aligned in a direction transverse to the bulk airflow direction B, such as the lateral direction.

In this embodiment, a portion of the diluent is injected into the combustor 300 using the plurality of primary fuel nozzles 340. This portion of the diluent is referred to herein as the primary portion of the diluent. The remainder of the diluent is injected into the combustor 300 using the plurality of secondary fuel nozzles 400 (or in the alternative embodiment discussed above the plurality of diluent nozzles 400B). This portion of the diluent is referred to herein as the secondary portion of the diluent. Preferably, the primary portion of the diluent is from twenty percent to eighty percent of the diluent being injected into the combustion chamber over a given time interval, and the secondary portion of the diluent is the remaining portion of the diluent injected into the combustion chamber over the time interval (e.g., twenty to eighty percent). These percentages may also be determined for a segment of the combustor 300, such as the segment discussed above with reference to FIG. 4.

As discussed above, the diluent metering valve 244 is configured to provide a desired volume of diluent, at, for example, a desired flow rate, to the combustion chamber 330. As shown in FIG. 3, the diluent metering valve 244 is fluidly connected to a primary diluent manifold 256 and a secondary diluent manifold 258. The primary diluent manifold 256 and the secondary diluent manifold 258 distribute (provide) the diluent received to the primary fuel nozzles 340 and secondary fuel nozzles 400, respectively. After being metered to the desired flow rate by the diluent metering valve 244, the diluent is then split based on the desired percentage distribution to the primary diluent manifold 256 and the secondary diluent manifold 258 to be subsequently injected into the combustion chamber 330 by the primary fuel nozzles 340 and the secondary fuel nozzles 400. The ratio (percentage) of diluent injected by the primary fuel nozzles 340 and the secondary fuel nozzles 400 may be set (or static) for a given combustor 300, but this ratio may also be adjustable. For example, the metering system 240 may also include at least one diluent proportioning valve 248 that can be used to adjust the amount of diluent distributed to the primary diluent manifold 256 and the secondary diluent manifold 258.

Figure 5:
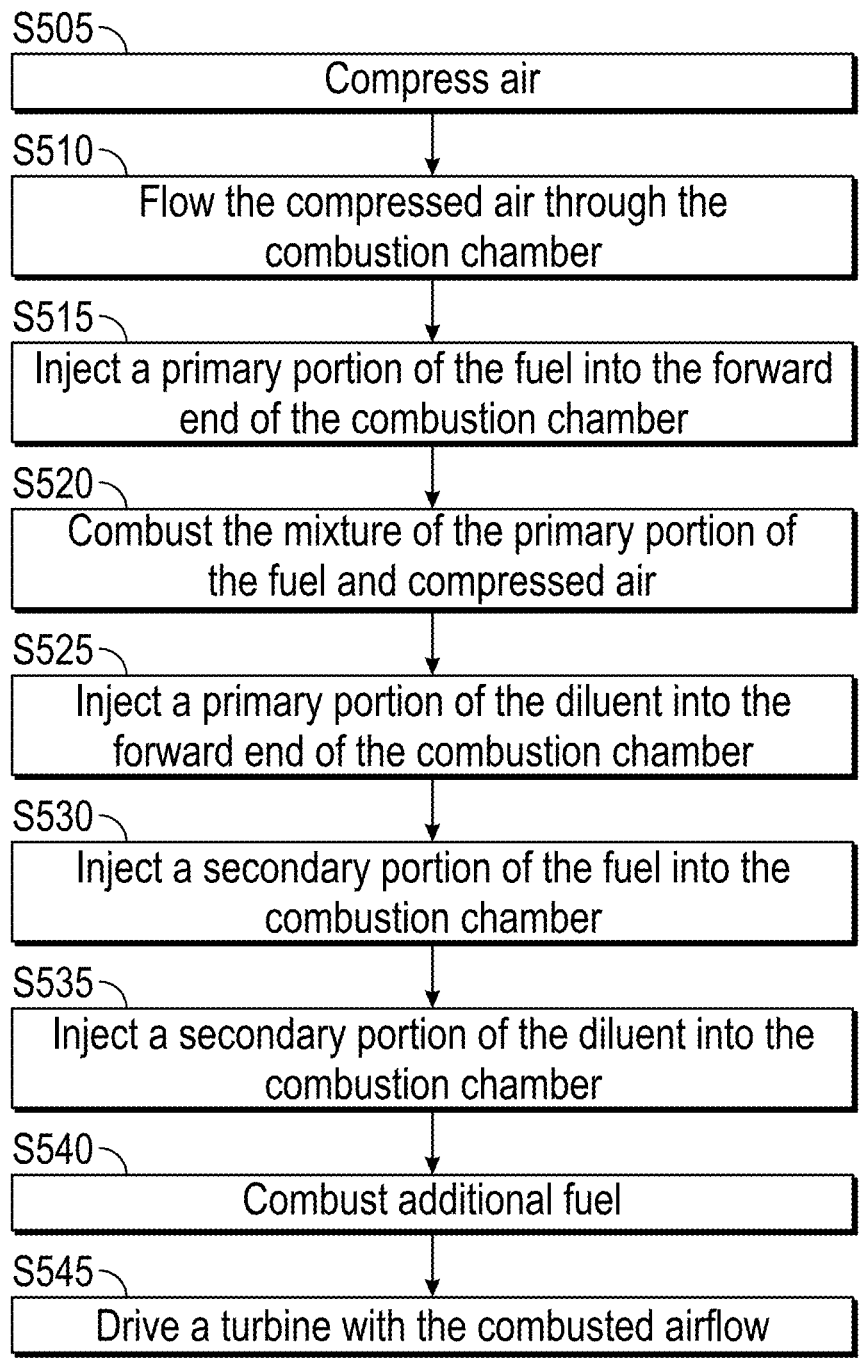
FIG. 5 is a flow chart showing a method of operating a gas turbine engine, such as the gas turbine engine shown in FIG. 2 according to an embodiment of the present disclosure.

FIG. 5 is a flowchart showing a method of operating a gas turbine engine (such as engine 100) according to an embodiment of the present disclosure. Although FIG. 5 is a flowchart depicting a linear sequence, the method should be appreciated as having the various steps discussed below occur continuously or simultaneously with each other. In addition, the steps may have another order other than as depicted in FIG. 5. In step S505, air is compressed, using, for example, the LP compressor 110 and the HP compressor 112. Then in step S510, the compressed air is directed (flows) through the combustion chamber 330. As discussed above, the primary air 302 flows in the bulk airflow direction B through the combustion chamber 330, and dilution air 304 is introduced through the dilution holes 326. The primary portion of the fuel and the primary portion of the diluent are injected into the forward end 322 of the combustion chamber 330 in steps S515 and S525 using, for example, the primary fuel nozzle 340, as discussed above. The primary portion of the fuel and the primary portion of the diluent is flowing throughout different power conditions of the engine 100 (from 0% to 100% power of the engine 100). As depicted in step S520 of FIG. 5, the mixture of the primary portion of the fuel and compressed air is combusted in the primary combustion zone 332.

The secondary portion of the fuel and the secondary portion of the diluent are injected into the combustion chamber 330 in steps S530 and S535. In a preferred embodiment, the secondary portion of the fuel and the secondary portion of the diluent are injected into the combustion chamber 330 under higher power conditions. Herein, lower power conditions are 20% of the total engine power and below, and higher power conditions are powers of the engine 100 that are greater than 20%. In an embodiment, only the primary portion of the fuel is flowing at lower power conditions, and both the primary portion of the fuel and the secondary portion of the fuel is flowing at higher power conditions. At lower power conditions, one of the primary portion of the diluent and the secondary portion of the diluent may be flowing or both the primary portion and the secondary portion of the diluent may be flowing. At higher power conditions, both the primary portion and the secondary portion of the diluent is flowing. The primary portion and the secondary portion of the fuel and/or the diluent can be operated in a way to maximize benefit on emission and efficiency. In the combustion chamber 330, the additional fuel not combusted in step S520 (only a residual fuel of the primary portion at lower power conditions or both the residual fuel of the primary portion of the fuel and the secondary portion of the fuel at higher power conditions) and the compressed air are mixed and the fuel is combusted in step S540. The combusted products exit the combustion chamber 330 by the outlet 324 and then drives a turbine, such as the HP turbine 116 and the LP turbine 118 in step S545. Additional details of the method are described herein relative to, for example, the aforementioned components (e.g., the primary fuel nozzle 340 and the secondary fuel nozzle 400).

Figure 6:
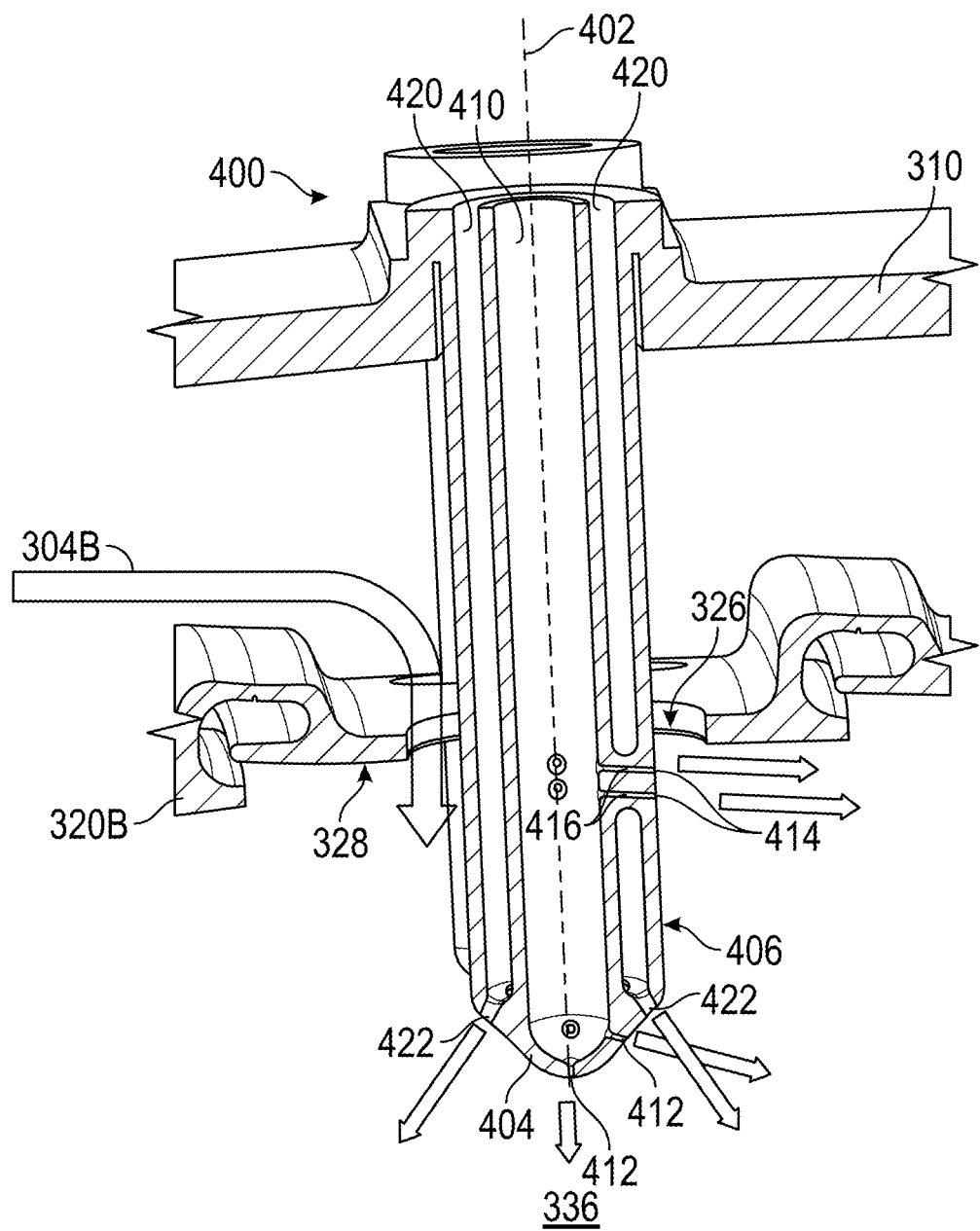
FIG. 6 is a cross-sectional view of a secondary fuel nozzle of the combustor shown in FIG. 3 taken along line 6-6 in FIG. 4
Figure 7:
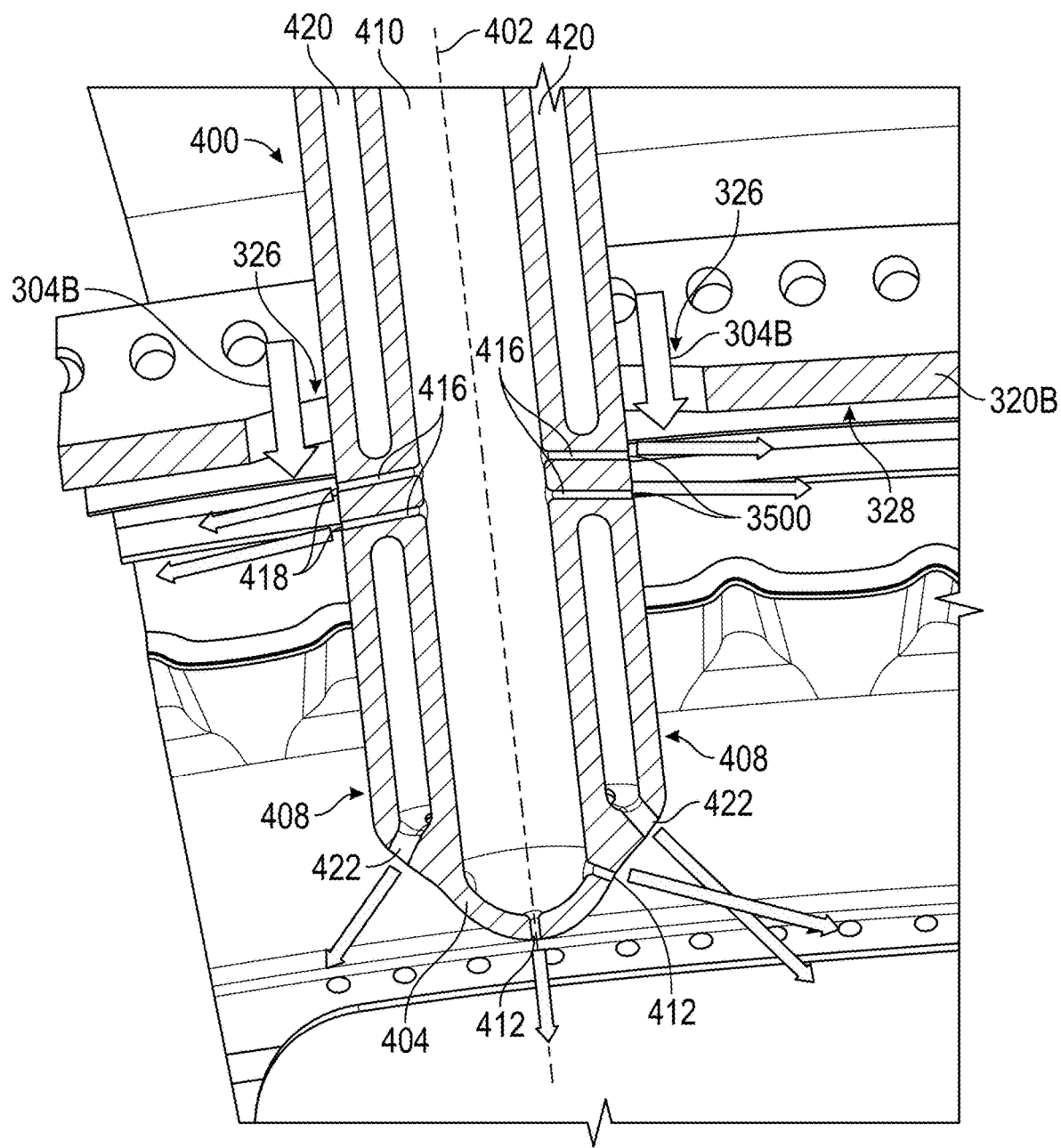
FIG. 7 is a cross-sectional view of the secondary fuel nozzle taken along line 7-7 in FIG. 3.

FIGS. 6 and 7 are cross-sectional views of the secondary fuel nozzle 400 that is configured to inject both fuel and diluent. FIG. 6 is a cross-sectional view of the secondary fuel nozzle 400 taken along line 6-6 in FIG. 4 and, thus, the left side of FIG. 6 is toward the forward end 322 of the combustion chamber 330 and the right side of FIG. 6 is toward the outlet 324 of the combustion chamber 330. FIG. 7 is a cross-sectional view of the secondary fuel nozzle 400 taken along line 7-7 in FIG. 3 and, thus, is a view looking toward the forward end 322 of the combustion chamber 330.

Figure 10A:
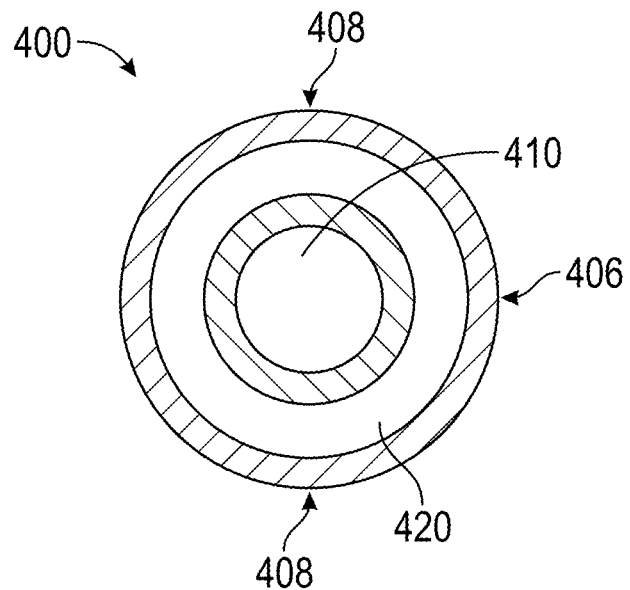
FIGS. 10A and 10B are cross-sectional views of the secondary fuel nozzle taken along line 10-10 in FIG. 3.
Figure 10B:
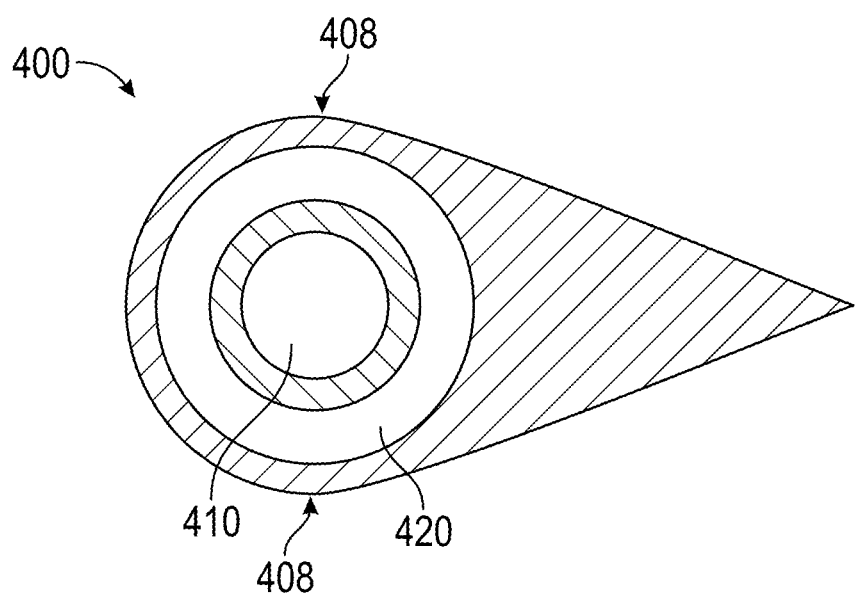

The secondary fuel nozzle 400 of this embodiment is cylindrical and, thus, has a radial direction and an axial direction. The secondary fuel nozzle 400 of this embodiment has a cross section taken in a direction orthogonal to the axial direction of the secondary fuel nozzle 400 along line 10-10 in FIG. 3. This cross section is shown in FIG. 10A, and as can be seen in FIG. 10A, this cross section is circular. Any suitable geometry may be used for the secondary fuel nozzle 400, however. For example, the secondary fuel nozzle 400 may have an airfoil shape, such as a teardrop shape as shown in FIG. 10B. The teardrop or other airfoil shape may be advantageous to reduce the wake in the airflow past the secondary fuel nozzle 400. The secondary fuel nozzle 400 is mounted to the combustor case 310 and extends through the space between the combustor case 310 and combustor liner 320 before projecting into the combustion chamber 330. As discussed above, the secondary fuel nozzle 400 projects through the dilution hole 326, and, in this embodiment, the diameter of the dilution hole 326 is larger than the diameter of the secondary fuel nozzle 400 and sized to allow desired amount of dilution air 304 to flow around the secondary fuel nozzle 400 and into the combustion chamber 330. As noted above, the secondary fuel nozzle 400 does not need to be inserted through the dilution hole 326, but may be inserted through a separate opening on the combustor outer liner 320B.

The combustor liner 320 has an inner surface 328 (a surface facing the combustor 300) that surrounds the dilution hole 326. In this embodiment, the secondary fuel nozzle 400 projects into the combustor 300 in a direction that is generally normal to the inner surface 328 of the combustor liner 320. The term "generally normal" accounts for potential curvature in the inner surface 328 of the combustor liner 320 and contemplates small deviations from normal including, for example, five degrees. The secondary fuel nozzle 400 includes a central axis 402, and the orientation of the secondary fuel nozzle 400 may be taken with reference to the central axis 402. With the secondary fuel nozzle 400 projecting in a generally normal direction, the secondary fuel nozzle 400 projects in a direction to deliver the secondary portion of the fuel and diluent to the secondary combustion zone 334, and more specifically in this embodiment to the core region 336. The secondary fuel nozzle 400 thus preferably projects a sufficient distance, such as from zero to four times the diameter of the secondary fuel nozzle 400, to deliver the secondary portion of the fuel and the diluent to the core region 336.

Figure 8:
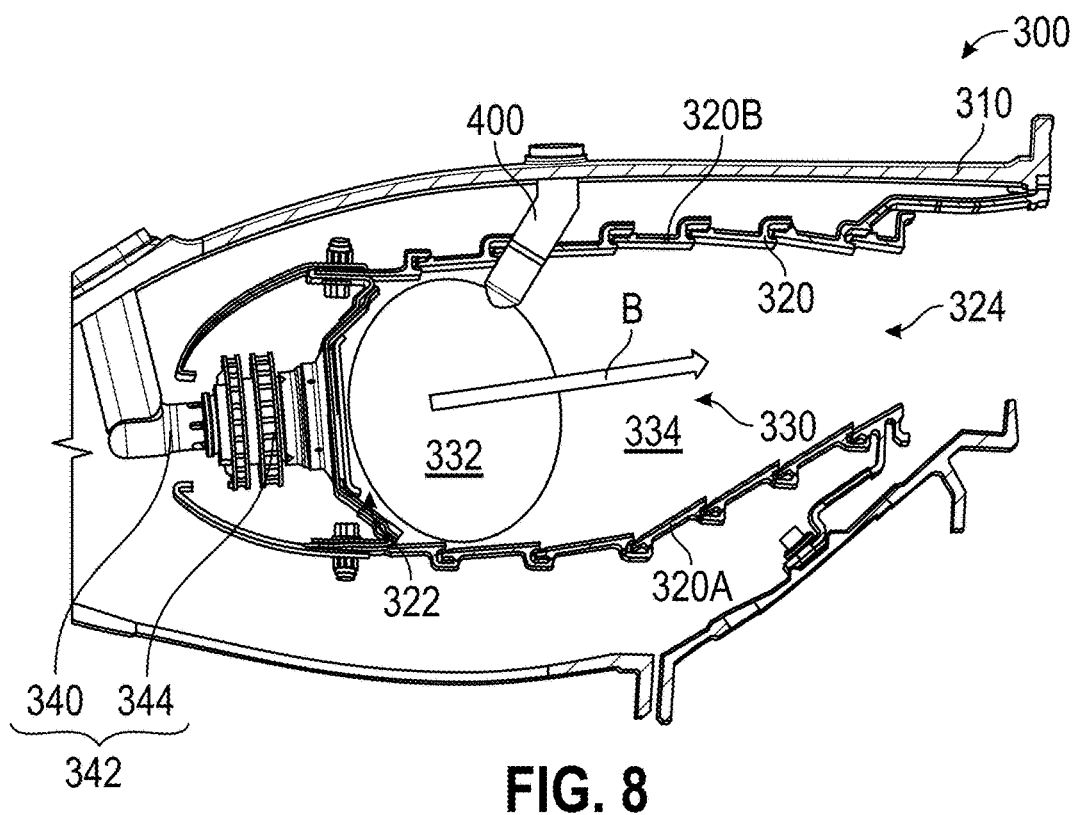
FIG. 8 is cross-sectional view of the combustor shown in FIG. 3 with the secondary fuel nozzle in an alternate orientation.
Figure 9:
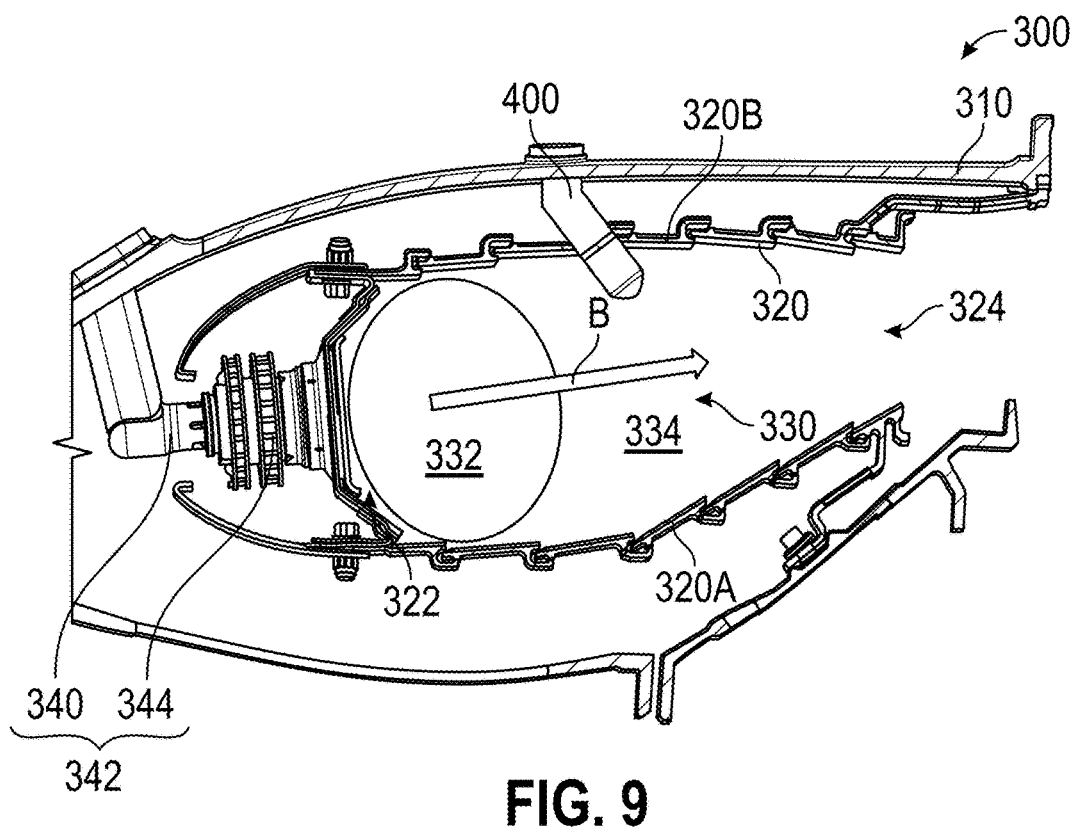
FIG. 9 is cross-sectional view of the combustor shown in FIG. 3 with the secondary fuel nozzle in another alternate orientation.

The secondary fuel nozzle 400 may, however, have other orientations. The secondary fuel nozzle 400 may project into the combustion chamber 330 in a direction that forms an oblique angle with the inner surface 328 of the combustor liner 320. For example, the secondary fuel nozzle 400 may project in a direction toward the primary combustion zone 332, as shown in FIG. 8. In another example, the secondary fuel nozzle 400 may have a cold side projection and project in a direction with the bulk airflow direction towards the outlet 324 of the combustion chamber 330, as shown in FIG. 9.

As shown in FIGS. 6 and 7, the secondary fuel nozzle 400 may have a plurality of passages, such as a first passage 410 and a second passage 420, each configured to convey one of the secondary portion of the fuel and the secondary portion of the diluent. In this embodiment, the first passage 410 is fluidly connected to the secondary diluent manifold 258 and is configured to convey diluent, and the second passage 420 is fluidly connected to the secondary fuel manifold 254 and is configured to convey fuel. The opposite configuration where the first passage 410 conveys the fuel and the second passage 420 conveys the diluent may also be a suitable configuration for the secondary fuel nozzle 400. The plurality of passages may have any suitable geometry and configuration within the secondary fuel nozzle 400. In this embodiment, the first passage 410 is cylindrical with the axis of the first passage 410 coincident with the central axis 402 of the secondary fuel nozzle 400. The second passage 420 of this embodiment has an annular geometry and surrounds the first passage 410 in the radial direction of the secondary fuel nozzle 400, which is also the radial direction of the first passage 410. The axis of the second passage 420 is coincident with the central axis 402 of the secondary fuel nozzle 400.

The secondary fuel nozzle 400 has a tip 404 and each of the first passage 410 and the second passage 420 extend to the tip 404. The first passage 410 includes a plurality of orifices 412 configured to discharge the diluent from the first passage 410 (and, thus, the secondary fuel nozzle 400) into the combustion chamber 330. The plurality of orifices 412 of the first passage 410 may discharge the diluent in a direction parallel to the central axis 402 of the secondary fuel nozzle 400, but they may also discharge the diluent radially outward from the central axis 402. Likewise, the second passage 420 includes a plurality of orifices 422 configured to discharge the fuel from the second passage 420 (and, thus, the secondary fuel nozzle 400) into the combustion chamber 330. The plurality of orifices 422 of the second passage 420 may discharge the fuel in a direction parallel to the central axis 402 of the secondary fuel nozzle 400, but they may also discharge the fuel radially outward from the central axis 402.

With the secondary fuel nozzle 400 extending into the combustion chamber 330 the plurality of orifices 412 of the first passage 410 are thus configured to target the core region 336, which may be a hot spot of the combustion chamber 330. The secondary fuel nozzle 400 may also be configured to target other hot spots. One such hot spot is the wake or region behind (downstream in the bulk airflow direction B) of the secondary fuel nozzle 400. The secondary fuel nozzle 400 is configured to inject diluent into the combustion chamber 330 towards a position behind the secondary fuel nozzle 400 in the bulk airflow direction B. The secondary fuel nozzle 400 may have at least one downstream orifice 414 on a downstream surface 406 of the secondary fuel nozzle 400, as shown in FIG. 6. The downstream orifice 414 is fluidly connected to the first passage 410 by a channel 416. In this embodiment, two downstream orifices 414 are provided on the secondary fuel nozzle 400 with one downstream orifice 414 above the other downstream orifice 414 in the axial direction of the secondary fuel nozzle 400. Each downstream orifice 414 is configured to direct (inject) diluent into the region behind (downstream in the bulk airflow direction B) the secondary fuel nozzle 400 and target the wake of the secondary fuel nozzle 400 and the dilution jet formed by dilution air 304 flowing around fuel nozzle. In this embodiment, the downstream orifices 414 direct diluent in the bulk airflow direction and in a direction generally parallel to the inner surface 328 of the combustor outer liner 320B. Other configurations, such as multiple orifices 414 clustered around the location behind secondary fuel nozzle 400 or dilution hole 326 to reduce high temperature regions and hence NOx emission may be used. In addition, various different shapes of the orifices 414 may be used to effectively spread the secondary portion of the diluent in a region of high temperature.

Another hot spot may be the portions of the combustion chamber 330 between the dilution holes 326. The secondary fuel nozzle 400 may configured to inject a diluent towards this hot spot and into the combustion chamber 300 in a lateral direction from the secondary fuel nozzle 400. Each secondary fuel nozzle 400 may also include a lateral orifice 418 on at least one of the lateral side surfaces 408 (sides of the secondary fuel nozzle 400 in the lateral direction), as shown in FIG. 7. The lateral orifice 418 is fluidly connected to the first passage 410 by a channel 416. In this embodiment, two lateral orifices 418 are provided on each lateral side surface 408 of the secondary fuel nozzle 400 with one lateral orifice 418 above the other lateral orifice 418 in the axial direction of the secondary fuel nozzle 400. The lateral orifices 418 are configured to direct (inject) diluent into the region between the dilution holes 326. The lateral orifices 418 are thus configured to direct diluent laterally. The lateral orifices 418 may be configured to direct diluent in a lateral direction that is generally parallel to the inner surface 328 of the combustor outer liner 320B.

Further aspects of the present disclosure are provided by the subject matter of the following clauses.

1. A gas turbine engine comprising: (A) a compressor section including a plurality of compressor fan blades configured to compress air flowing therethrough and to provide the air as compressed air; (B) a combustor for combusting a fuel, the combustor configured to receive the compressed air from the compressor section, the combustor including: (a) a combustor liner having (i) a combustion chamber formed therein, (ii) a forward end, and (iii) an outlet, the combustor liner being configured to have the compressed air flow therethrough in a bulk airflow direction from the forward end of the combustion chamber to the outlet of the combustion chamber, the combustion chamber having a primary combustion zone and a secondary combustion zone located downstream of the primary combustion zone in the bulk airflow direction; (b) at least one primary fuel nozzle at the forward end of the combustor liner, the at least one primary fuel nozzle being configured to inject a primary portion of the fuel into the primary combustion zone; and (c) at least one secondary fuel nozzle downstream of the at least one primary fuel nozzle in the bulk airflow direction, the at least one secondary fuel nozzle being configured to inject a secondary portion of the fuel into the secondary combustion zone, wherein the combustor is configured to mix the compressed air with the primary portion of the fuel and the secondary portion of the fuel to form a fuel and air mixture, to combust the fuel and air mixture forming combustion products, and to discharge the combustion products through the outlet of the combustion chamber; and (C) a turbine configured to receive the combustion products and be driven by the combustion products, wherein the turbine is configured to rotate the plurality of compressor fan blades of the compressor section.

2. The gas turbine engine of any preceding clause, further comprising a plurality of primary fuel nozzles, the plurality of primary fuel nozzles being configured to inject the primary portion of the fuel into the primary combustion zone; and a plurality of secondary fuel nozzles, the plurality of secondary fuel nozzles being configured to inject a secondary portion of the fuel into the secondary combustion zone.

3. The gas turbine engine of any preceding clause, wherein the primary portion of the fuel is from thirty percent to eighty percent of the fuel being injected into the combustion chamber over a time interval, and the secondary portion of the fuel is the remaining portion of the fuel injected into the combustion chamber over the time interval.

4. The gas turbine engine of any preceding clause, further comprising a plurality of diluent nozzles downstream of the plurality of primary fuel nozzles in the bulk airflow direction, the plurality of diluent nozzles being configured to inject a diluent into the combustion chamber.

5. The gas turbine engine of any preceding clause, wherein the plurality of secondary fuel nozzles and the plurality of diluent nozzles are aligned in a direction transverse to the bulk airflow direction.

6. The gas turbine engine of any preceding clause, wherein at least a portion of the plurality of secondary fuel nozzles are further configured to inject a diluent into the combustion chamber.

7. The gas turbine engine of any preceding clause, wherein the combustor includes a segment having the at least one primary fuel nozzle and the at least one secondary fuel nozzle, wherein the primary portion of the fuel is from thirty percent to eighty percent of the fuel being injected into the segment of the combustion chamber over a time interval, and the secondary portion of the fuel is the remaining portion of the fuel injected into the segment of the combustion chamber over the time interval.

8. The gas turbine engine of any preceding clause, wherein the at least one secondary fuel nozzle is configured to inject the secondary portion of the fuel into the combustion chamber in a transverse direction, the transverse direction being a direction transverse to the bulk airflow direction.

9. The gas turbine engine of any preceding clause, wherein the at least one secondary fuel nozzle projects into the combustion chamber from the combustor liner.

10. The gas turbine engine of any preceding clause, wherein the combustion liner has an inner surface surrounding the at least one secondary fuel nozzle, and wherein the at least one secondary fuel nozzle projects into the combustion chamber in a direction that forms an oblique angle with the inner surface of the combustion liner.

11. The gas turbine engine of any preceding clause, wherein the at least one secondary fuel nozzle projects into the combustion chamber in a direction toward the primary combustion zone.

12. The gas turbine engine of any preceding clause, wherein the combustion liner has an inner surface surrounding the at least one secondary fuel nozzle, and wherein the at least one secondary fuel nozzle projects into the combustion chamber in a direction generally normal to the inner surface of the combustion liner.

13. The gas turbine engine of any preceding clause, wherein the at least one secondary fuel nozzle is further configured to inject a diluent into the combustion chamber towards a position behind the at least one secondary fuel nozzle in the bulk airflow direction.

14. The gas turbine engine of any preceding clause, wherein the combustion liner has an inner surface surrounding the at least one secondary fuel nozzle, and wherein the at least one secondary fuel nozzle is further configured to inject a diluent into the combustion chamber in a lateral direction from the at least one secondary fuel nozzle.

15. The gas turbine engine of any preceding clause, wherein the lateral direction is a direction generally parallel to the inner surface of the combustion liner.

16. The gas turbine engine of any preceding clause, wherein the at least one secondary fuel nozzle is further configured to inject a diluent into the combustion chamber.

17. The gas turbine engine of any preceding clause, wherein the at least one secondary fuel nozzle includes (i) a first passage configured to convey one of the diluent and the secondary portion of the fuel and (ii) a second passage configured to convey the other one of the diluent and the secondary portion of the fuel.

18. The gas turbine engine of any preceding clause, wherein the first passage is cylindrical having an axis and a radial direction relative to the axis of the first passage, and wherein the second passage is annular, the second passage surrounding the first passage in the radial direction.

19. The gas turbine engine of any preceding clause, wherein the combustor includes a segment having the at least one primary fuel nozzle and the at least one secondary fuel nozzle, wherein the at least one primary fuel nozzle is further configured to inject a primary portion of the diluent into the combustion chamber, and the at least one secondary fuel nozzle is configured to inject a secondary portion of the diluent into the combustion chamber, the primary portion of the diluent being from twenty percent to eighty percent of the diluent injected into the segment of the combustion chamber over a time interval, and the secondary portion of the diluent is the remaining portion of the fuel injected into the segment of the combustion chamber over the time interval.

20. The gas turbine engine of any preceding clause, further comprising: (D) a fuel system including: (a) a fuel tank configured to hold the fuel; (b) a fuel delivery assembly fluidly connecting the fuel tank to the at least one primary fuel nozzle and the at least one secondary fuel nozzle; and (c) a fuel metering valve in communication with the fuel delivery assembly and configured to provide a desired volume of fuel to the at least one primary fuel nozzle and the at least one secondary fuel nozzle; and (E) a diluent system including: (a) a diluent tank configured to hold the diluent; (b) a diluent delivery assembly fluidly connecting the diluent tank to the at least one primary fuel nozzle and the at least one secondary fuel nozzle; and (c) a diluent metering valve in communication with the diluent delivery assembly and configured to provide a desired volume of diluent to the at least one primary fuel nozzle and the at least one secondary fuel nozzle.

21. The gas turbine engine of any preceding clause, wherein the fuel is hydrogen fuel, wherein the fuel tank is configured to hold the hydrogen fuel in a liquid phase, and wherein the fuel system further includes (d) a vaporizer in communication with the fuel delivery assembly for heating the hydrogen fuel in the liquid phase to at least one of a gaseous phase and a supercritical phase, the vaporizer being located between the fuel tank and the combustor.

22. The gas turbine engine of any preceding clause, wherein the fuel system further includes (d) at least one fuel proportioning valve configured to adjust the amount of fuel supplied to the at least one primary fuel nozzle and the amount of fuel supplied to the at least one secondary fuel nozzle, and wherein the diluent system further includes (d) at least one diluent proportioning valve configured to adjust the amount of diluent supplied to the at least one primary fuel nozzle and the amount of diluent supplied to the at least one secondary fuel nozzle.

23. The gas turbine engine of any preceding clause, wherein the diluent is at least one of water, nitrogen, and carbon dioxide.

24. The gas turbine engine of any preceding clause, wherein the combustor liner further includes a at least one dilution hole, the at least one dilution hole being configured to introduce dilution air into the combustion chamber.

25. The gas turbine engine of any preceding clause, wherein the at least one secondary fuel nozzle projects through the at least one dilution hole into the combustion chamber.

26. The gas turbine engine of any preceding clause, wherein the at least one secondary fuel nozzle has a cross section, the cross section being one of a circle and a teardrop shape.

27. The gas turbine engine of any preceding clause, wherein the fuel is one of diatomic hydrogen fuel and a hydrogen enriched fuel.

28. A gas turbine engine comprising: (A) a compressor section including a plurality of compressor fan blades configured to compress air flowing therethrough and to provide the air as compressed air; (B) an annular combustor for combusting a fuel, the combustor having a circumferential direction and configured to receive the compressed air from the compressor section, the combustor including: (a) a combustor liner having (i) a combustion chamber formed therein, (ii) a forward end, and (iii) an outlet, the combustor liner being configured to have the compressed air flow therethrough in a bulk airflow direction from the forward end of the combustion chamber to the outlet of the combustion chamber, the combustion chamber having a primary combustion zone and a secondary combustion zone located downstream of the primary combustion zone in the bulk airflow direction; (b) a plurality of primary fuel nozzles at the forward end of the combustor liner and aligned in the circumferential direction of the combustor, the plurality of primary fuel nozzles being configured to inject a primary portion of the fuel into the primary combustion zone and a primary portion of a diluent into the primary combustion zone; (c) a plurality of secondary fuel nozzles downstream of the primary fuel nozzle in the bulk airflow direction and aligned in the circumferential direction of the combustor, the plurality of secondary fuel nozzles being configured to inject a secondary portion of the fuel into the secondary combustion zone and a secondary portion of the diluent into the secondary combustion zone, wherein the primary portion of the fuel is from thirty percent to eighty percent of the fuel being injected into the combustion chamber over a time interval, and the secondary portion of the fuel is the remaining portion of the fuel injected into the combustion chamber over the time interval, wherein the primary portion of the diluent is from twenty percent to eighty percent of the diluent injected the combustion chamber over a time interval, and the secondary portion of the diluent is the remaining portion of the fuel injected into the combustion chamber over the time interval, and wherein the combustor is configured to mix the compressed air with the primary portion of the fuel and the secondary portion of the fuel to form a fuel and air mixture, to combust the fuel and air mixture forming combustion products, and to discharge the combustion products through the outlet of the combustion chamber; and (C) a turbine configured to receive the combustion products and be driven by the combustion products, wherein the turbine is configured to rotate the plurality of compressor fan blades of the compressor section.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A method of operating a gas turbine engine, the method comprising:
   flowing compressed air through a combustion chamber of a combustor in a bulk airflow direction from a forward end of the combustion chamber to an outlet of the combustion chamber;
   injecting a primary portion of a fuel into a primary combustion zone at the forward end of the combustion chamber using a primary fuel nozzle;
   injecting a primary portion of a diluent into the primary combustion zone at the forward end of the combustion chamber;
   injecting a secondary portion of the fuel into a secondary combustion zone of the combustion chamber using a secondary fuel nozzle, the secondary combustion zone being located downstream of the primary combustion zone in the bulk airflow direction; and
   injecting a secondary portion of the diluent into the combustion chamber,
   wherein the primary portion of the diluent being from twenty percent to eighty percent of the diluent injected into the combustion chamber over a time interval, and the secondary portion of the diluent is the remaining portion of the diluent injected into the combustion chamber over the time interval.

2. The method of claim 1, wherein the diluent is at least one of water, nitrogen, and carbon dioxide.

3. The method of claim 1, wherein the fuel is one of diatomic hydrogen fuel and a hydrogen enriched fuel.

4. The method of claim 1, wherein the secondary portion of the diluent is injected into the combustion chamber in a direction transverse to the bulk airflow direction.

5. The method of claim 4, wherein the secondary portion of the diluent is injected into the combustion chamber at an oblique angle to the bulk airflow direction.

6. The method of claim 1, wherein the primary portion of the fuel is from thirty percent to eighty percent of the fuel being injected into the combustion chamber over a time interval, and the secondary portion of the fuel is the remaining portion of the fuel injected into the combustion chamber over the time interval.

7. The method of claim 6, wherein the combustor includes a segment,
wherein the primary portion of the diluent and the secondary portion of the diluent are injected into the segment of the combustion chamber over the time interval, and
wherein the primary portion of the fuel and the secondary portion of the fuel are injected into the segment of the combustion chamber over the time interval.

8. The method of claim 1, wherein the gas turbine engine has a total engine power and the gas turbine engine may be operated at lower power conditions and higher power conditions, lower power conditions being 20% of the total engine power and below and higher power conditions being greater than 20% of the total engine power, and
wherein, when the gas turbine engine is operating at a higher power condition, the secondary portion of the fuel and the secondary portion of the diluent are injected into the combustion chamber.

9. The method of claim 8, wherein, when the gas turbine engine is operating at a lower power condition, the secondary portion of the fuel and the secondary portion of the diluent are not injected into the combustion chamber.

10. The method of claim 1, wherein the primary portion of the fuel is from thirty percent to eighty percent of the fuel being injected into the combustion chamber over a time interval, and the secondary portion of the fuel is the remaining portion of the fuel injected into the combustion chamber over the time interval.

11. The method of claim 10, wherein the combustor includes a segment,
wherein the primary portion of the diluent and the secondary portion of the diluent are injected into the segment of the combustion chamber over the time interval, and
wherein the primary portion of the fuel and the secondary portion of the fuel are injected into the segment of the combustion chamber over the time interval.

12. The method of claim 1, wherein the primary fuel nozzle is one of a plurality of primary fuel nozzles, the plurality of primary fuel nozzles injecting the primary portion of the fuel into the primary combustion zone, and
wherein the secondary fuel nozzle is one a plurality of secondary fuel nozzles, the plurality of secondary fuel nozzles injecting the secondary portion of the fuel into the secondary combustion zone.

13. The method of claim 12, wherein the primary portion of the diluent is injected into the primary combustion zone using the plurality of primary fuel nozzles.

14. The method of claim 12, wherein the secondary portion of the diluent is injected into the combustion chamber using a plurality of diluent nozzles separate from the plurality of secondary fuel nozzles.

15. The method of claim 12, wherein the secondary portion of the diluent is injected into the combustion chamber using the plurality of secondary fuel nozzles.

16. The method of claim 1, wherein the combustor includes a segment, the primary portion of the diluent and the secondary portion of the diluent being injected into the segment of the combustion chamber over the time interval.

17. The method of claim 16, wherein the primary portion of the diluent is injected into the primary combustion zone using the primary fuel nozzle.

18. The method of claim 16, wherein the secondary portion of the diluent is injected into the combustion chamber using a diluent nozzle separate from the secondary fuel nozzle.

19. The method of claim 16, wherein the secondary portion of the diluent is injected into the combustion chamber using the secondary fuel nozzle.

20. The method of claim 19, wherein the secondary fuel nozzle injects at least a portion of the secondary portion of the diluent into the combustion chamber towards a position behind the secondary fuel nozzle in the bulk airflow direction.

* * * * *